United States Patent [19]

Tomasek et al.

[11] 4,376,473
[45] Mar. 15, 1983

[54] MULTIPLE CLUTCH CONTROL SYSTEM

[75] Inventors: Donald J. Tomasek, Downers Grove; Benjamin L. McCash, Burr Ridge, both of Ill.

[73] Assignee: International Harvester Co., Chicago, Ill.

[21] Appl. No.: 247,704

[22] Filed: Mar. 26, 1981

[51] Int. Cl.³ .............................................. F16D 25/10
[52] U.S. Cl. ................................ 192/3.58; 192/87.18; 74/664
[58] Field of Search .................... 192/3.58, 3.57, 48.2, 192/48.9, 49, 87.13, 87.19, 87.18, 87.17, 87.16, 87.15, 87.14; 74/664

[56] References Cited

U.S. PATENT DOCUMENTS

| | | | |
|---|---|---|---|
| 2,844,043 | 7/1958 | Hobbs | 192/87.19 |
| 2,946,241 | 7/1960 | Snyder | 192/87.18 |
| 3,110,196 | 11/1963 | Hilpert et al. | 192/87.19 |
| 3,541,791 | 11/1970 | Lvovsky | 192/87.18 |
| 3,618,727 | 11/1971 | Cornet | 192/87.19 |
| 3,722,646 | 3/1973 | Oguma | 192/87.18 |
| 3,762,518 | 10/1973 | Hilpert | 192/87.13 |
| 4,219,109 | 8/1980 | Ushijima et al. | 192/87.13 |
| 4,321,991 | 3/1982 | Teijido | 192/3.58 |

Primary Examiner—George H. Krizmanich
Attorney, Agent, or Firm—John W. Gaines; F. David AuBuchon

[57] ABSTRACT

A multiple clutch control system for controlling the operation of clutches in a multiple speed transmission of the type wherein the gear ratio of the transmission is operated by engaging one hydraulically operated clutch while simultaneously disengaging another hydraulically operated clutch includes circuitry responsive to the hydraulic pressure applied to the just engaged or on going clutch for preventing the disengagement of the other clutch until the hydraulic pressure applied to the just engaged clutch exceeds a predetermined level indicating that the just engaged clutch has engaged.

15 Claims, 1 Drawing Figure

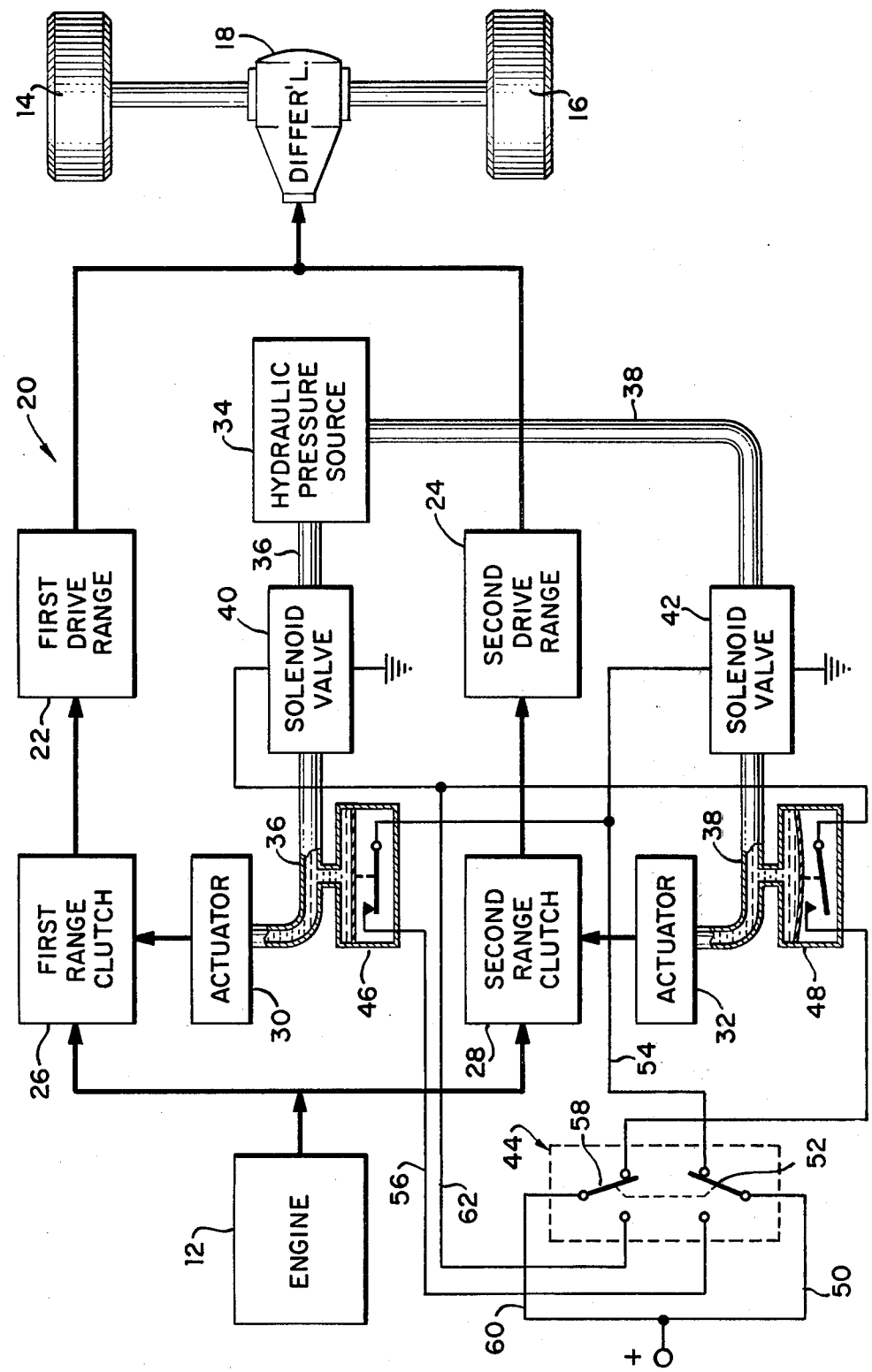

MULTIPLE CLUTCH CONTROL SYSTEM

BACKGROUND OF THE INVENTION

1. Field of the Invention

This invention relates to power transmission systems, and more particularly to power transmission systems utilizing a plurality of clutches for varying the gear ratio of a transmission by selectively engaging one clutch while substantially simultaneously disengaging another clutch, and even more particularly, this invention relates to the control of such clutches.

2. Description of the Prior Art

Transmissions that shift gears by engaging one clutch while simultaneously disengaging another clutch are known. However, such transmissions, particularly those utilizing multiple plate clutches, have the disadvantage of rough shifts that jolt the vehicle during the shift, particularly if the shift is made under load, such as for example, in a heavily loaded tractor. Since such jolts are quite uncomfortable and can result in damage to the vehicle, or in the case of a tractor, to the farm implement being pulled, various attempts have been made to reduce the aforementioned jolts. Most of these attempts have been directed to the design of the clutches themselves, or to the use of special clutches, such as spray clutches or overrunning clutches that lock up in one direction only; and while such attempts have substantially reduced the jolt produced during a shift, the solution has not been entirely satisfactory since such special clutches tend to be expensive and exhibit poor reliability.

SUMMARY OF THE INVENTION

Accordingly, it is an object of the present invention to overcome many of the disadvantages of the prior art systems.

It is another object of the present invention to provide a transmission of the type using multiple clutches to shift gear ratios that provides smooth shifts without requiring specially designed clutches.

It is yet another object of the present invention to provide a transmission of the type having multiple clutches which may be selectively engaged or disengaged to change the transmission gear ratio that provides smooth shifts by precisely sequencing the engagement and disengagement of the clutches.

It is yet another object of the present invention to provide a transmission of the type having multiple clutches which may be selectively engaged or disengaged to change the transmission gear ratio that provides smooth shifts by preventing the disengagement of one clutch until the other clutch has engaged.

It is yet another object of the present invention to provide a transmission of the type having multiple clutches which may be selectively engaged or disengaged to change the transmission gear ratio that provides smooth shifts by providing temporary clutch overlap whereby one or both clutches are forced slightly to slip for an instant.

It has been found that much of the jolt produced by a multiple clutch transmission of the type wherein one clutch is disengaged while another is engaged during the gear shifting operation results from the fact that standard disc type clutches, particularly the hydraulically operated multiple disc variety, have different engaging and disengaging characteristics. More particularly, it has been found that such clutches disengage very rapidly, but engage rather slowly. Thus, when a multiple clutch transmission is shifted, there is a time lag between the disengagement of the first clutch and the engagement of the second clutch, during which time no power is being transmitted. Consequently, when the first clutch disengages, a loaded vehicle will rapidly decelerate, and then rapidly accelerate when the second clutch engages, thereby resulting in a severe jolt.

Thus, in accordance with a preferred embodiment of the invention, there is provided a multiple clutch, variable ratio transmission of the type that is shifted by engaging one clutch while disengaging another wherein the clutch to be disengaged is not permitted to disengage until the clutch to be engaged has engaged sufficiently to transmit substantial torque thereby, as accommodated by the temporary clutch slippage, to eliminate the time interval wherein no torque is being transmitted. This can be readily achieved in, for example, a transmission having hydraulically operated clutches by employing a pressure sensor in the hydraulic line controlling the two clutches and using logic circuitry to prevent the clutch to be disengaged from being disengaged until the hydraulic pressure actuating the engaging clutch reaches a predetermined level indicating that that clutch has been engaged.

DESCRIPTION OF THE DRAWING

These and other objects and advantages of the present invention will become readily apparent upon consideration of the following detailed description and attached drawing wherein:

The single FIGURE is a block diagram of the clutch control system according to the invention.

DETAILED DESCRIPTION OF THE PREFERRED EMBODIMENT

Referring now to the FIGURE, there is shown a source of rotary power, such as an internal combustion engine 12 coupled to a device to be powered such as a pair of driving wheels 14 and 16 via a differential 18 and a transmission system generally designated by the reference numeral 20. The transmission system 20 is, in the present embodiment, a dual range transmission system having a first drive range 22, which may be, for example, a mechanical gear box or a direct drive, a second drive range 24, which may also be a mechanical gear box or a direct drive, but which typically will provide a different gear ratio between its input and output shafts than the first drive range 22. A first range clutch 26 is interposed between the engine 12 and the first drive range 22, and a second range clutch 28 is interposed between the engine 12 and a second drive range 24. Preferably, the first and second range clutches 26 and 28 are standard friction plate clutches, preferably of the multiple plate type, and may be interposed between the engine 12 and the respective first and second drive ranges 22 and 24, as indicated in the drawing, between the respective drive ranges 22 and 24 and the differential 18, or even within the drive ranges 22 and 24. Moreover, the first and second drive ranges 22 and 24 may be combined into a single unit, and the first and second range clutches 26 and 28 may be disposed within the drive range to permit power to be selectively transferred through various gear sets within the drive range to effect a change in gear ratio. However, the range clutches 26 and 28, as well as the drive ranges 22 and 24, are illustrated as separate units for purposes of clarity.

Preferably, the range clutches 26 and 28 are hydraulically operated clutches that are engaged and disengaged by a pair of actuators 30 and 32, respectively. A source of hydraulic pressure 34, such as, for example, a hydraulic pump and suitable reservoir, applies hydraulic pressure to the actuators 30 and 32 via a pair of hydraulic lines 36 and 38 under the control of a pair of solenoid valves 40 and 42 which selectively permit hydraulic pressure to be applied from the hydraulic pressure source 34 to the actuators 30 and 32 or to permit hydraulic fluid to return from the actuators 30 and 32 to a reservoir (not shown) within the hydraulic pressure source 34. Line pressure is automatically monitored in the pair of lines 36 and 38 by a pair of pressure switches 46 and 48 included respectively therein and now to be described.

In accordance with an important aspect of the present invention, the actuators 30 and 32, and hence the clutches 26 and 28 are controlled by a speed selector control switch 44 cooperating with a pair of sensing switches, in the present embodiment, the pair of pressure switches 46 and 48 which serve to control the solenoid valves 40 and 42. In the illustrated embodiment, the switch 44 is a double pole, double throw switch and the pressure switches 46 and 48 are normally closed switches, that is, switches that are normally closed when no hydraulic pressure is present, but which open upon the application of hydraulic pressure. In addition, the pressure switches 46 and 48 may be adjusted to open at a predetermined hydraulic pressure, such as, for example, 58 p.s.i.

In operation, with the switch 44 positioned as illustrated, power is applied from a source of positive potential via a conductor 50 through one armature 52 of the switch 44 and a second conductor 54 to the solenoid valve 42. As a result, the solenoid valve 42 is energized and causes hydraulic pressure to be applied to the actuator 32, thereby causing the second range clutch to be engaged, thus permitting power to be applied to the differential 18 from the engine 12 through the clutch 28 and the second drive range 24. The switch 48 is maintained in an open condition when the pressure in the line 38 is sufficient to maintain the clutch 28 engaged. Under these conditions, the vehicle is in the second drive range.

If it is desired to shift the vehicle into the first drive range, the switch 44 is switched such that the armature 52 connects the line 50 to a line 56. Simultaneously, an armature 58, which is ganged with the armature 52, of the switch 44 serves to connect a line 60 to a line 62. This causes the solenoid valve 40 to be energized to permit hydraulic pressure to be applied to the actuator 30 to engage the range clutch 26. However, although the connection between the conductors 50 and 54 is broken when the switch 44 is switched, a new connection between the line 50 and 56 is established through the armature 52. This causes power to be applied to the line 56, through the normally closed pressure switch 46 to the solenoid valve 42, thereby maintaining the second range clutch engaged until the pressure in the hydraulic line 36 is raised sufficiently to cause the actuator 30 to engage the first range clutch 26. At this point, the normally closed pressure switch 46 opens, thereby deenergizing the solenoid valve 42 causing hydraulic fluid to flow out of the actuator 32 and disengage the second range clutch 26. Under these conditions, power flows from the engine 12 to the differential 18 through the first range clutch 26 and the first drive range 22. This automatic sequencing results in an overlap in the actuation of the clutches and substantially reduces the jolt that would occur if one clutch disengaged before the other engaged.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. In a rotary power transmission of the type having a plurality of gears and first and second clutches cooperating with said gears for selectively shifting the transmission from a first gear ratio to a second gear ratio by engaging the first clutch while substantially disengaging the second clutch, the improvement of first and second clutch actuators for the respective clutches and control means comprising plural switches connected to activate and deactivate the first and second actuators for the first and second clutches, respectively, said control means effectively switching to make the shift selection and said plural switches including clutch pressure switch means responsive to said first clutch for preventing the disengagement of said second clutch until said first clutch is substantially engaged.

2. The improvement recited in claim 1 wherein said first and scond clutches are hydraulic pressure actuated clutches and said control means further comprises solenoid valves hydraulically connected to different ones of said clutches and electrically connected to different ones of said plural switches.

3. The improvement recited in claim 2 wherein the clutch pressure switch means constituting said first clutch responsive means consists of an hydraulic pressure clutch switch responsive to the hydraulic pressure applied to said first clutch.

4. The improvement recited in claim 3 wherein said hydraulic pressure responsive means includes a hydraulic line coupled to said hydraulic pressure actuated clutch, and said hydraulic pressure responsive means further includes in said line the hydraulic pressure clutch switch communicating with said hydraulic pressure line and responsive to the pressure in said hydraulic pressure line for selectively opening and closing the switch.

5. The improvement recited in claim 4 wherein said hydraulic pressure clutch switch is a normally closed switch which remains closed until the pressure in the hydraulic pressure line exceeds a predetermined level.

6. The improvement recited in claim 5 wherein said predetermined level is 58 p.s.i.

7. A rotary power transmission system comprising:
a power input shaft;
a power output shaft;
first means interposed between said power input shaft and said power output shaft for transferring power between said power input shaft and said power output shaft at a first predetermined rotational speed ratio;
second means interposed between said power input shaft and said power output shaft for transferring power between said power input shaft and said power output shaft at a second predetermined rotational speed ratio;
first clutch means cooperating with said first power transferring means for selectively interrupting the flow of power through said first power transferring means between said power input shaft and said power output shaft;

second clutch means cooperating with said second power transferring means for selectively interrupting the flow of power through said second power transferring means between said power input shaft and said power output shaft;

first actuator means coupled to said first clutch means for selectively engaging and disengaging said first clutch means;

second actuator means coupled to said second clutch means for selectively engaging and disengaging said second clutch means; and selector means for selectively causing said first and second actuator means to selectively engage one of said first and second clutch means, while substantially simultaneously disengaging the other one of said first and second clutch means, said selector means including means responsive to the engagement of said one of said clutches for preventing the disengagement of the other one of said clutches until said one clutch has engaged;

said system characterized wherein said selector means includes a manually operable selector switch having a first condition of operation and a second condition of operation, and wherein said first and second actuator means are responsive to the condition of operation of said selector switch, said first actuator means being operative to engage said first clutch means when said selector switch is in the first condition of operation, said second actuator means being operative to engage said second clutch means when said selector switch is in the second condition of operation.

8. A rotary power transmission system as recited in claim 7 wherein said preventing means includes a first sensing switch responsive to the actuation of said first clutch means and a second sensing switch responsive to the actuation of the second clutch means.

9. A rotary power transmission system as recited in claim 8 wherein said first actuating means includes a first hydraulic actuator, and said second actuating means includes a second hydraulic actuator.

10. A rotary power transmission system as recited in claim 9 further including a source of hydraulic pressure and means including first and second hydraulic valves for selectively applying hydraulic pressure from said source to said first and second hydraulic actuators, respectively.

11. A rotary power transmission system as recited in claim 10 wherein said first sensing switch includes a first pressure switch responsive to the hydraulic pressure applied to said first hydraulic actuator and said second sensing switch includes a second pressure switch responsive to the hydraulic pressure applied to said second actuator.

12. A rotary power transmission system as recited in claim 11 wherein said first and second hydraulic valves are electrically operated valves.

13. A rotary power transmission system as recited in claim 12 wherein said first pressure switch is electrically coupled to said second hydraulic valve, and said second pressure switch is electrically coupled to said first hydraulic valve, said first pressure switch being operative to cause said second hydraulic valve to apply hydraulic pressure to said second actuator whenever the hydraulic pressure applied to said first actuator is below a predetermined value, said second pressure switch being operative to cause said first hydraulic valve to apply hydraulic pressure to said first actuator whenever the hydraulic pressure applied to said second actuator is below a predetermined value.

14. A rotary power transmission system as recited in claim 8 wherein said first sensing switch is electrically coupled to said second actuator means and maintains said second clutch engaged when said first clutch is disengaged, and said second sensing switch is electrically coupled to said first actuator means and maintains said first clutch engaged when said second clutch is disengaged.

15. Control for a gear drive transmission having first and second clutches for shifting from a first transmission gear ratio to a second transmission gear ratio when the first clutch substantially engages and the second clutch disengages after a transitory period of clutch overlap, comprising:

first and second monitor means, said second monitor means (48) effective to detect, at an initial time, that said second clutch (28) is engaged;

said first monitor means (46) effective to detect, at a subsequent time, that the first clutch (26) is undergoing substantial engagement; and means (44, 56, 46, 54, 42) connected to the first and second monitor means responsive to said first means (46) detecting that the first clutch (26) is undergoing substantial engagement and effective to simultaneously disengage the second clutch (28) at that subsequent time.

* * * * *